N. Calver,
Wrench.

No 7,362. Patented May 14, 1850.

UNITED STATES PATENT OFFICE.

NATHL. COLVER, OF BOSTON, MASSACHUSETTS, ASSIGNOR TO COLVER AND DAMRELL.

REVOLVING-JAW WRENCH.

Specification of Letters Patent No. 7,362, dated May 14, 1850.

*To all whom it may concern:*

Be it known that I, NATHANIEL COLVER, of Boston, in the county of Suffolk and State of Massachusetts, have invented a new and useful or Improved Screw-Wrench; and I do hereby declare that the same is fully described and represented in the following specification and accompanying drawings, letters, figures, and references thereof.

Figure 1:
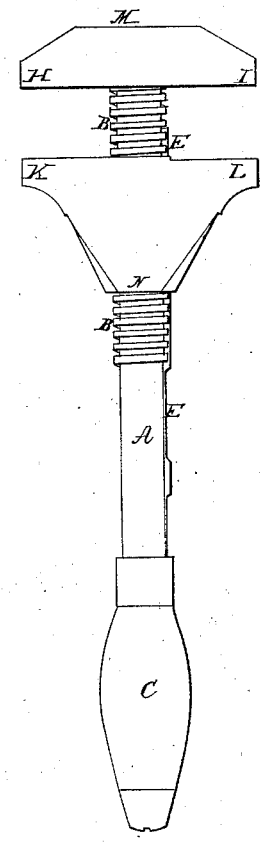
Figure 2:
Figure 3:
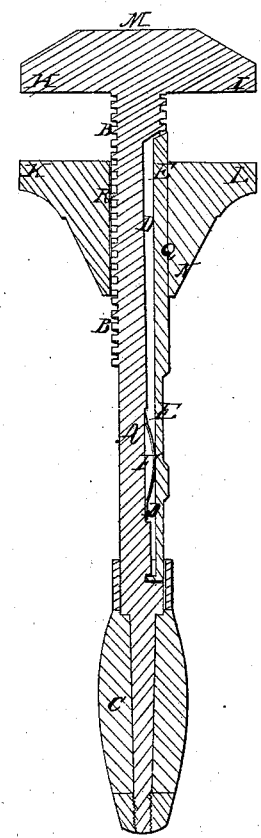

Of the said drawings Figure 1, denotes a side view, Fig. 2, an end view, and Fig. 3, a longitudinal and central section of my improved screw wrench.

A, in the said drawings represents the shank of the wrench, which is formed cylindrical, has a male screw B, made upon one part of it, and is fitted into a handle C, as is seen in the drawings. It together with the screw part of it is also formed with a long recess D, for the reception of a feather, or long piece or bar of metal E, which is placed within the same, and made to bear against a spring F, disposed between it and the bottom of the recess as seen in Fig. 3. The recess extended a short distance into the handle C, so as to admit the lower end of the feather E, into the handle in order to keep it, (the feather) in place. On the upper end of the shank A, instead of having but one fixed jaw, as is the case in the ordinary screw wrenches, I employ two jaws H, I, formed on a block of metal M, the two jaws being made to extend in opposite directions, or on opposite sides of the shank A, as seen in Figs. 1, and 3.

A block N, having a female screw cut through it, and adapted to the male screw of the shank, is placed on the screw B, and is made with one or two jaws K, L, which extend in opposite directions, or on opposite sides of the screw, as seen in the drawings.

Figure 4:
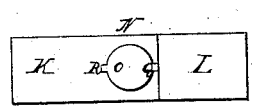

Fig. 4, denotes a top view of the block N, in which the screw hole for the reception of the screw of the shank is seen at O, and as made with two recesses Q, R, extending entirely through the block and on opposite sides of the axis of the screw passage O, each of the said recesses being just of a size to receive the feather E, for a short distance, and thereby in connection with said feather, to constitute a means of retaining either of the jaws K, and L, directly under either of the jaws H, and I, at pleasure.

Figure 5:
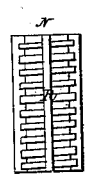
Figure 6:
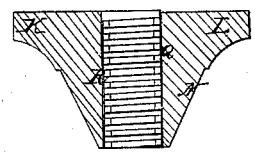

Fig. 5, is a transverse, and Fig. 6, a longitudinal section of the block N, the same being made to exhibit how the recesses Q, R, extend from top to bottom of the block.

The two operative or gripping surfaces, or the jaws H, I, which are respectively parallel to the jaws K, L, are arranged in the same plane, while such is not the case with respect to the jaws or gripping surfaces K, L, one of which, viz. L, being placed in a plane situated at a distance of one half the breadth of the screw thread of the other or K. The distance therefore between the jaw L, and the jaw directly over it, whether it be directly under the jaw H, or I, will always differ from or be greater than the distance of the jaw K, from the jaw directly over it, a distance equal to one half the width of the screw thread. This will be found of great convenience while using the instrument, as should the distance between the jaw K, and the one directly over it, be not quite sufficient to admit a screw nut, to which it may be desirable to apply it, the said nut may generally be introduced between the jaw L, and that one directly over the same.

A good wrench may be made by dispensing with the jaw L, or using but one jaw K, to the block N, and in connection with the two jaws H, I.

To increase or diminish the distance between the jaws of the block N, and those of the block M, it is only necessary while the wrench is held in the right hand, to apply the thumb thereof to the feather E, in such manner as to crowd it into its socket D, and out of the recess Q, or R, in which it may happen to be. Then by applying the hand to the block M, and rotating it in the proper direction, the distance of it from the block N, may be varied at pleasure.

I claim—

The revolving jaw block N, and feather E, as combined together and with the screw-shank A and made to operate substantially as herein before specified.

In testimony whereof I have hereto set my signature.

NATHL. COLVER.

Witnesses:
R. H. EDDY,
SAMUEL NICOLSON.